(12) United States Patent
Lim et al.

(10) Patent No.: US 11,495,119 B1
(45) Date of Patent: Nov. 8, 2022

(54) SECURITY ECOSYSTEM

(71) Applicant: MOTOROLA SOLUTIONS, INC., Chicago, IL (US)

(72) Inventors: Bing Qin Lim, Bayan Lepas (MY); Zhe Qian Goh, Simpang Ampat (MY); Chung Yong Chong, Bayan Lepas (MY); Shyan Jenq Ho, Banyan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/445,093

(22) Filed: Aug. 16, 2021

(51) Int. Cl.
*G06F 3/048* (2013.01)
*G08B 27/00* (2006.01)
*G06F 3/0484* (2022.01)

(52) U.S. Cl.
CPC ......... *G08B 27/005* (2013.01); *G06F 3/0484* (2013.01)

(58) Field of Classification Search
CPC ............... G08B 27/005; G06F 3/0484; G06Q 10/103; G06Q 20/3552; G06Q 10/0633
See application file for complete search history.

(56) References Cited

U.S. PATENT DOCUMENTS

| | | | |
|---|---|---|---|
| 6,069,655 A | 5/2000 | Seeley et al. | |
| 7,679,507 B2 | 3/2010 | Babich et al. | |
| 9,226,047 B2 | 12/2015 | Thorwirth et al. | |
| 10,254,934 B2 * | 4/2019 | Chauhan | H04L 63/1425 |
| 10,678,418 B1 * | 6/2020 | Nelson | G06F 3/04847 |
| 10,706,284 B2 | 7/2020 | Eaton et al. | |
| 10,832,563 B2 | 11/2020 | Subramanian et al. | |
| 11,296,971 B1 * | 4/2022 | Jain | H04L 41/22 |
| 2009/0049108 A1 * | 2/2009 | Forde | G06Q 10/06 707/999.203 |
| 2011/0173071 A1 * | 7/2011 | Meyer | G06Q 30/02 705/14.54 |
| 2011/0276396 A1 * | 11/2011 | Rathod | G06Q 20/10 707/706 |
| 2013/0090963 A1 * | 4/2013 | Sharma | G06Q 10/063112 705/7.13 |
| 2013/0185348 A1 * | 7/2013 | Hall | G06F 15/16 709/203 |

(Continued)

FOREIGN PATENT DOCUMENTS

| | | |
|---|---|---|
| CN | 103838857 B | 2/2017 |
| CN | 104483661 B | 3/2017 |

(Continued)

OTHER PUBLICATIONS

Distefano et al., Trustworthiness_for_Transportation_Ecosystems_The_Blockchain_Vehicle_Information_System, 2021, IEEE, 10 pages.*

(Continued)

*Primary Examiner* — Linh K Pham

(57) ABSTRACT

A system, method, and apparatus for implementing workflows across multiple differing systems and devices are provided herein. During operation a workflow is automatically generated upon the detection of new device capabilities. In particular, a workflow server will detect the presence of new device capabilities in a particular area. The new device capabilities will be analyzed, and an appropriate trigger and action will be determined based on the new device capabilities. The appropriate trigger and action will then be implemented as a newly-created workflow.

14 Claims, 13 Drawing Sheets

(56) References Cited

U.S. PATENT DOCUMENTS

| | | | | |
|---|---|---|---|---|
| 2014/0218763 A1* | 8/2014 | Takahashi | ............ | G06F 3/1288 |
| | | | | 358/1.15 |
| 2015/0229884 A1* | 8/2015 | Kupiec | ................ | H04N 7/188 |
| | | | | 348/143 |
| 2016/0352608 A1* | 12/2016 | Cornell | .................. | H04L 43/10 |
| 2017/0193810 A1 | 7/2017 | Cao et al. | | |
| 2017/0344921 A1* | 11/2017 | Leonelli | ................ | H04W 4/50 |
| 2018/0025276 A1 | 1/2018 | Hill et al. | | |
| 2018/0124098 A1* | 5/2018 | Carver | .................. | G06N 20/00 |
| 2019/0051390 A1* | 2/2019 | Shah | .................... | H04L 9/0643 |
| 2020/0192319 A1* | 6/2020 | Ong | ...................... | G10L 17/22 |
| 2020/0301678 A1* | 9/2020 | Burman | ................. | G06F 9/541 |
| 2021/0110345 A1 | 4/2021 | Iyer et al. | | |
| 2021/0165639 A1 | 6/2021 | Iyer et al. | | |
| 2021/0390486 A1* | 12/2021 | Chu | ................... | G06F 9/45558 |

FOREIGN PATENT DOCUMENTS

| | | |
|---|---|---|
| CN | 111208479 A | 5/2020 |
| CN | 111624567 A | 9/2020 |
| CN | 112861673 A | 6/2021 |
| CN | 113052738 A | 6/2021 |
| KR | 20180073273 A | 7/2018 |

OTHER PUBLICATIONS

Orchestrate User Guide, Motorola Solutions, Inc.—MN007834A01-B, Mar. 2021, all pages.

Orchestrate System Planner, Motorola Solutions, Inc.—MN007836A01-B, Mar. 2021, all pages.

\* cited by examiner

US 11,495,119 B1

SECURITY ECOSYSTEM

BACKGROUND OF THE INVENTION

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem will be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a system, method, and apparatus for implementing workflows across multiple differing systems and devices is provided herein. During operation a workflow is automatically generated upon the detection of new device capabilities. In particular, a workflow server will detect the presence of new device capabilities in a particular area. The new device capabilities will be analyzed, and an appropriate trigger and action will be determined based on the new device capabilities. The appropriate trigger and action will then be suggested as a newly-created workflow.

Figure 1A:
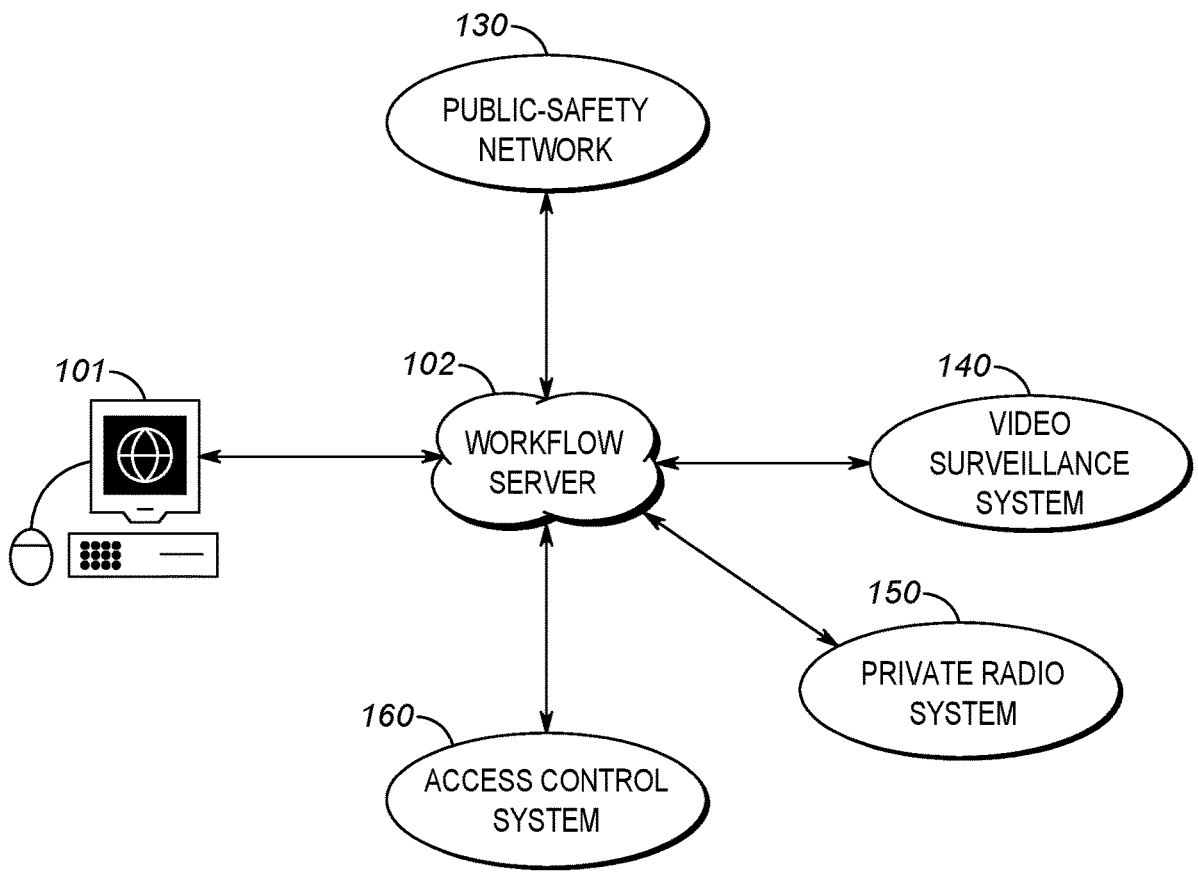
FIG. 1a illustrates a security ecosystem capable of configuring and automating workflows.

Turning now to the drawings, wherein like numerals designate like components, FIG. 1a illustrates security ecosystem 100 capable of configuring and automating workflows across multiple systems. As shown, security ecosystem 100 comprises public-safety network 130, video surveillance system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, . . . , etc. It should also be noted that although only networks and systems 130-160 are shown in FIG. 1a, one of ordinary skill in the art will recognize that many more networks and systems may be included in ecosystem 100.

Workstation 101 is preferably a computer configured to execute Motorola Solution's Orchestrate™ and Ally™ dispatch and incident management software. As will be discussed in more detail below, workstation 101 is configured to present a user with a plurality of triggers capable of being detected by network and systems 130-160 as well as present the user with a plurality of actions capable of being executed by network and systems 130-160. The user will be able to create workflows and upload these workflows to workflow server 102 based on the presented triggers and actions.

Workflow server 102 is preferably a server running Motorola Solution's Command Central™ software suite comprising the Orchestrate™ platform. Workflow server 102 is configured to receive workflows created by workstation 101 and implement the workflows. Particularly, the workflows are implemented by analyzing events detected by network and systems 130-160 and executing appropriate triggers. For example, assume a user creates a workflow on workstation 101 that has a trigger comprising surveillance system 140 detecting a loitering event, and has an action comprising notifying radios within public-safety network 130. When this workflow is uploaded to workflow server 102, workflow server 102 will notify the radios of any loitering event detected by surveillance system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video surveillance system 140 is configured to detect various triggers and report the detected triggers to workflow server 102. Public-safety network 130 is also configured to receive action commands from workflow server 102 and execute the actions. In one embodiment of the present invention, video surveillance system 140 comprises a plurality of video cameras that may be configured to automatically change their field of views over time. Video surveillance system 140 is configured with a recognition engine/video analysis engine (VAE) that comprises a software engine that analyzes any video captured by the cameras. Using the VAE, the video surveillance system 140 is capable of "watching" video to detect any triggers and report the detected triggers to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solution's Access Control Management (ACM)™ software suite.

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOBRO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. System 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an administrator using workstation 101 to create rule-based, automated workflows between technologies to enhance efficiency, and improve response times, effectiveness, and overall safety. The above ecosystem 100 has the capabilities to detect triggers across a number of devices within network and systems 130-160 quickly take actions by automatically executing the proper procedure (i.e., executing the appropriate action once a trigger is detected).

Figure 1B:
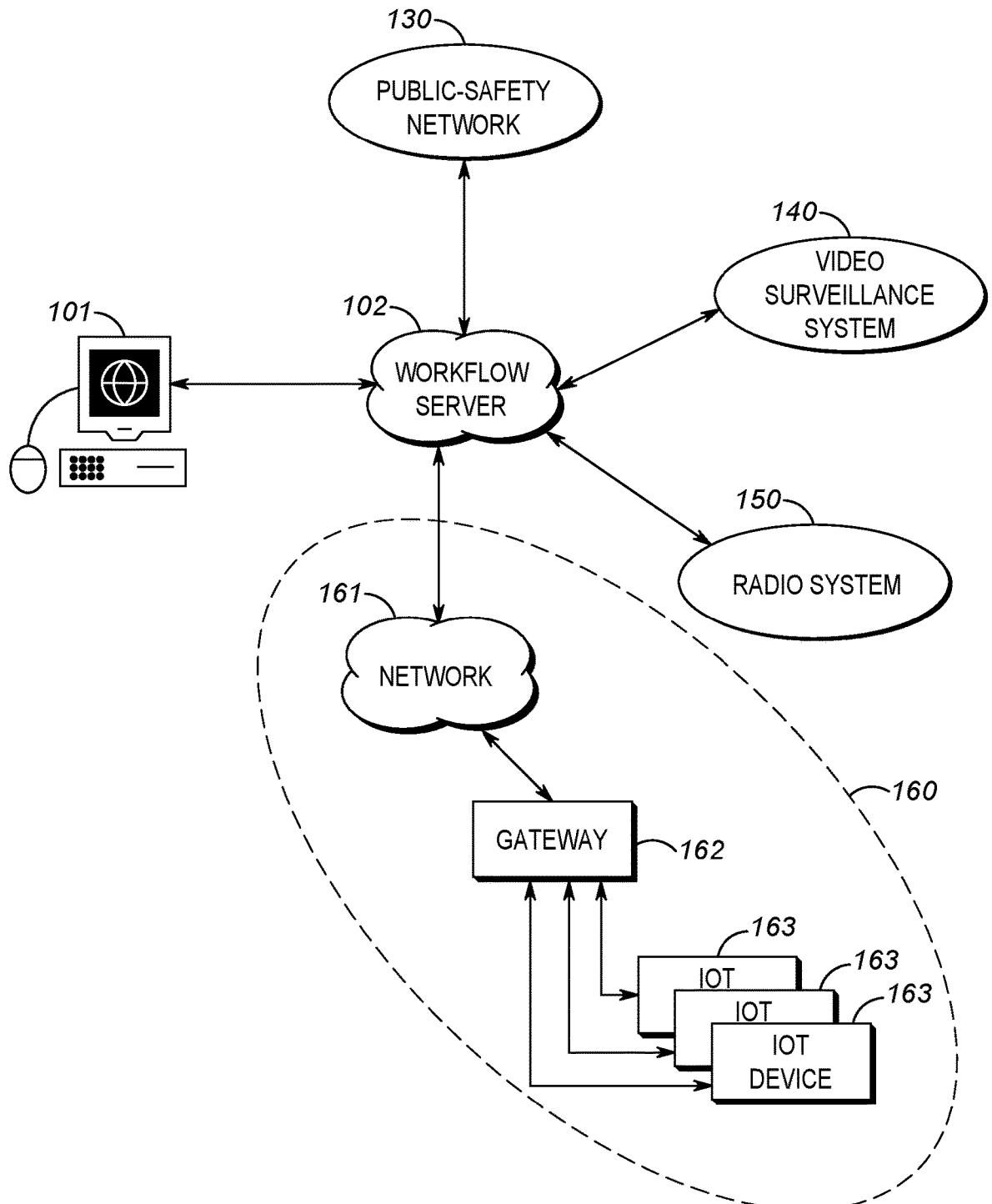
FIG. 1B illustrates a security ecosystem capable of configuring and automating workflows.

FIG. 1B illustrates a security ecosystem capable of configuring and automating workflows. In particular, FIG. 1B shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, sensors, . . . , etc. As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

Gateway 162 preferably comprises an Avigilon™ Control Center running Avigilon's Access Control Management software. Gateway 162 is configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Figure 1C:
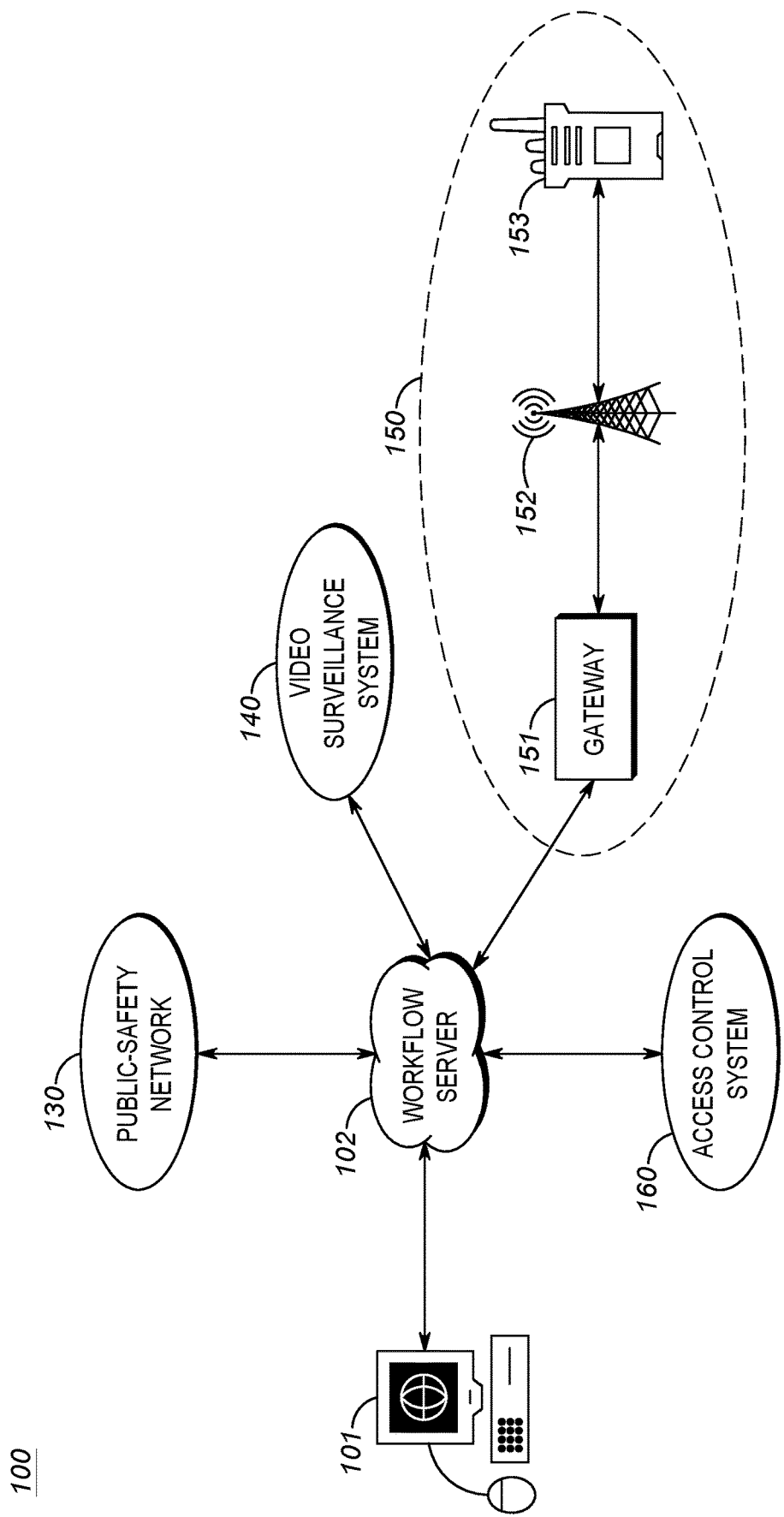
FIG. 1c illustrates a security ecosystem capable of configuring and automating workflows.

FIG. 1c illustrates a security ecosystem capable of configuring and automating workflows. In particular, FIG. 1c shows security ecosystem 100 with an expanded view of radio system 150. As shown, radio system 150 comprises gateway 151, system infrastructure 152, and at least one radio 153. Communications from radio 153 to workflow server 102 passes through infrastructure 152, gateway 151, and ultimately to workflow server 102.

Gateway 151 preferably comprises an Avigilon™ Control Center running Avigilon's Access Control Management software. Gateway 151 is configured to run the necessary Application Program Interface (API) to provide communications between any infrastructure 152 and workflow server 102.

Infrastructure 152 comprises the necessary equipment to provide wireless communications to and from radio 153.

Preferably, infrastructure 152 comprises Motorola Solutions MOTOBRO™ equipment, such as an SLR Series Repeater (e.g., SLR 1000, SLR 5000, or SLR8000 repeater) configured to provide two-way radio service to radio 153.

Although only a single radio 153 is shown in FIG. 1c, one of ordinary skill in the art will recognize that many radios 153 may be present within radio system 150. Each radio 153 preferably comprises a MOTOBRO™ two-way radio (such as a Motorola Solution XPR 5000 Series radio) with digital technology providing integrated voice and data communication.

Figure 1D:
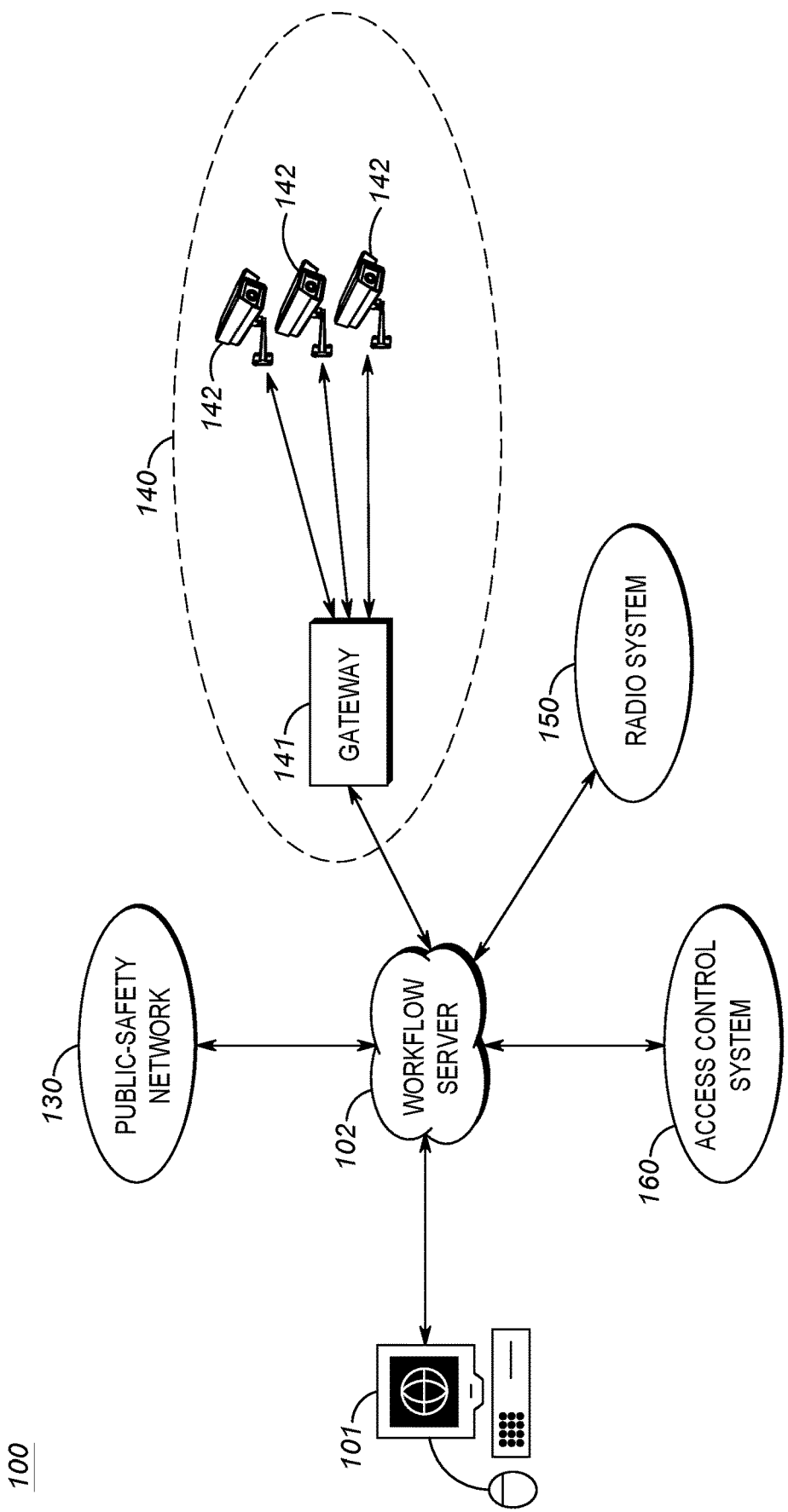
FIG. 1d illustrates a security ecosystem capable of configuring and automating workflows.

FIG. 1d illustrates a security ecosystem capable of configuring and automating workflows. In particular, FIG. 1d shows security ecosystem 100 with an expanded view of video surveillance system 140. As shown, video surveillance system 140 comprises a plurality of cameras 142 and gateway 141.

Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine configured to "watch" video and detect preselected objects such as license plates, people, faces, automobiles. The software engine may also be configured to detect certain actions of individuals, such as fighting, loitering, crimes being committed, . . . , etc. The VAE may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

Figure 1E:
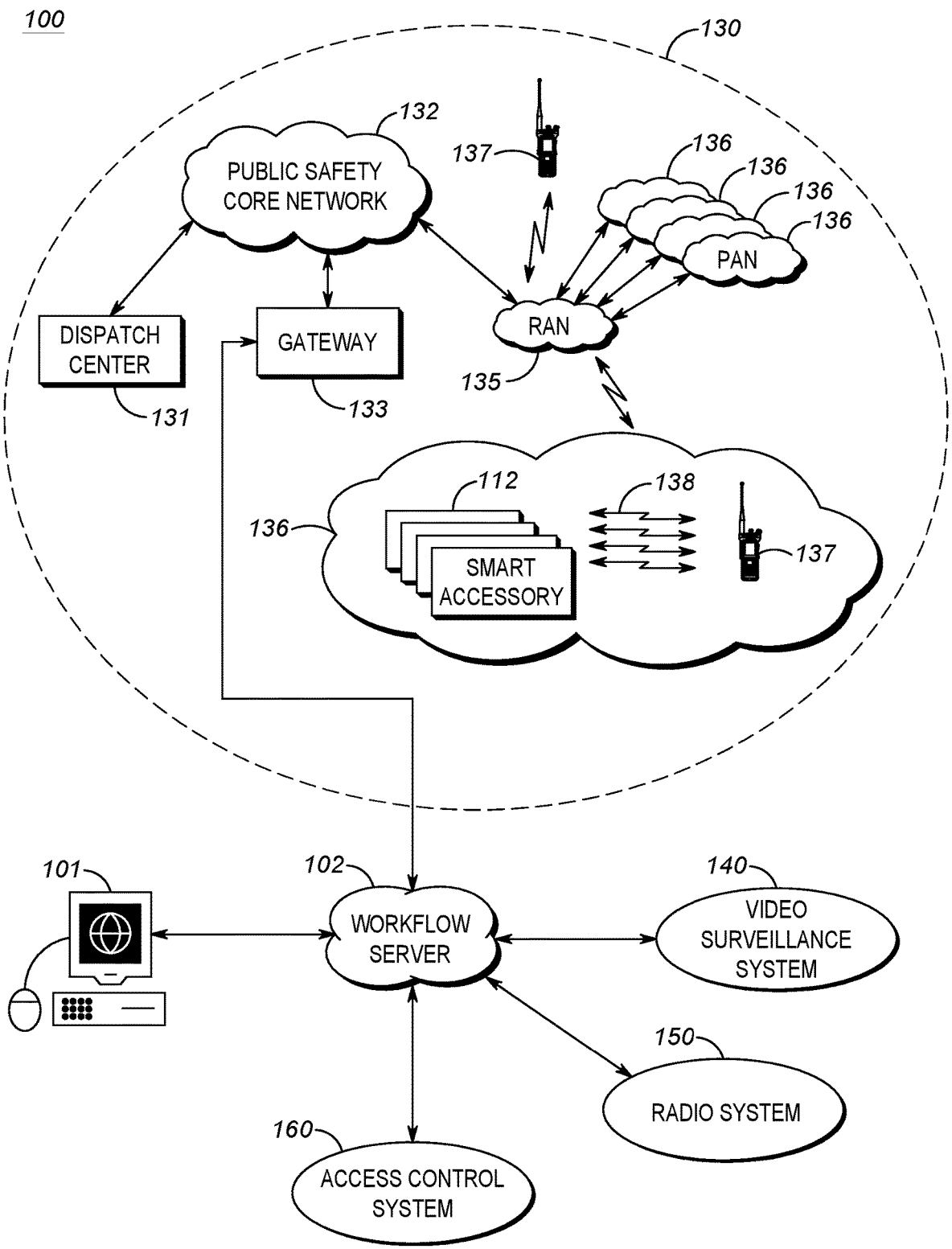
FIG. 1e illustrates a security ecosystem capable of configuring and automating workflows.

FIG. 1e illustrates a security ecosystem capable of configuring and automating workflows. In particular, FIG. 1e shows security ecosystem 100 with an expanded view of public safety network 130. As shown, public-safety network 130 comprises gateway 133, public-safety core network 132, dispatch center 131, radio access network (RAN) 135, at least one public-safety radio 137, and a plurality of personal-area networks (PANs) 136. As shown, each PAN 136 comprises radio 137 acting as a hub to smart devices/accessories 112.

Gateway 133 preferably comprises an Avigilon™ Control Center running Avigilon's Access Control Management software. Gateway 133 is configured to run the necessary Application Program Interface (API) to provide communications between public-safety core network 132 and workflow server 102.

A public safety officer (not shown in FIG. 1e) will be equipped with devices 112 that determine various physical and environmental conditions surrounding the public-safety officer. These conditions may be reported back to, for example, dispatch center 131 or workflow server 102 so an appropriate action may be taken. For example, future police officers may have a sensor 112 that determines when a gun is drawn. Upon detecting that an officer has drawn their gun, a notification may be sent back to the dispatch operator and/or workflow server 102 so that, for example, other officers in the area may be notified of the situation.

It is envisioned that the public-safety officer will have an array of these shelved devices 112 available to the officer at the beginning of a shift. The officer will select devices 112 off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a bio-sensor, . . . , etc. All devices 112 pulled by the officer will be configured to form a PAN by associating (pairing) with each other and communicating wirelessly among the devices. At least one device may be configured with a digital assistant. In a preferred embodiment, the PAN comprises more than two devices, so that many devices may be connected via the PAN simultaneously.

A method called bonding is typically used for recognizing specific devices 112 and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device. Thus, as shown, public-safety communication system 130 incorporates PANs 136 created as described above. In a preferred embodiment of the present invention, radios 137 and devices 112 form PAN 136, with communication links 138 between devices 112 and radios 137 taking place utilizing a short-range communication system protocol such as a Bluetooth communication system protocol. In this particular embodiment, a pan will be associated with a single officer. Thus, FIG. 1e illustrates multiple PANs 136 associated with multiple officers (not shown).

RAN 135 includes typical RAN elements such as base stations, base station controllers (BSCs), routers, switches, and the like, arranged, connected, and programmed to provide wireless service to user equipment (e.g., radios 137, and the like) in a manner known to those of skill in the relevant art. RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 135 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 135 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 132 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 132 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radios 137 serves as a PAN main device, and may be any suitable computing and communication device configured to engage in wireless communication with the RAN 135 over the air interface as is known to those in the relevant art. Moreover, one or more radios 137 are further configured to engage in wired and/or wireless communication with one or more local device 112 via the communication link 138. Radios 137 will be configured to determine when to forward information received from PAN devices to, for example, a dispatch center or workflow server 102.

Some examples follow of devices 112 follow:

A sensor-enabled holster 112 may be provided that maintains and/or provides state information regarding a weapon or other item normally disposed within the user's sensor-enabled holster 112. The sensor-enabled holster 112 may detect a change in state (presence to absence) and/or an action (removal) relative to the weapon normally disposed within the sensor-enabled holster 112. The detected change in state and/or action may be reported to portable radio 137 via its short-range transceiver, which may forward the state change to dispatch center 131 or workflow server 102. In some embodiments, the sensor-enabled holster may also detect whether the first responder's hand is resting on the weapon even if it has not yet been removed from the holster and provide such information to portable radio 137.

A biometric sensor 112 (e.g., a biometric wristband) may be provided for tracking an activity of the user or a health status of a user, and may include one or more movement sensors (such as an accelerometer, magnetometer, and/or gyroscope) that may periodically or intermittently provide to the portable radio 137 indications of orientation, direction, steps, acceleration, and/or speed, and indications of health such as one or more of a captured heart rate, a captured breathing rate, and a captured body temperature of the user, perhaps accompanying other information. This information may be reported to radio 137 which may forward the information to dispatch center 131 and/or workflow server 102.

An accelerometer 112 may be provided to measures acceleration. Single and multi-axis models are available to detect magnitude and direction of the acceleration as a vector quantity, and may be used to sense orientation, acceleration, vibration shock, and falling. The accelerometer 112 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to radio 137 which may forward the information to dispatch center 131 and/or workflow server 102.

A heart rate sensor 112 may be provided and use electrical contacts with the skin to monitor an electrocardiography (EKG) signal of its wearer, or may use infrared light and imaging device to optically detect a pulse rate of its wearer, among other possibilities. This information may be reported to radio 137 which may forward the information to dispatch center 131 and/or workflow server 102.

A breathing rate sensor 112 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to radio 137 which may forward the information to dispatch center 131 and/or workflow server 102.

Dispatch center 131 comprises, or is part of, a computer-aided-dispatch center (sometimes referred to as an emergency-call center or public-safety answering point), that may be manned by an operator providing necessary dispatch operations. For example, dispatch center 131 typically comprises a graphical user interface that provides the dispatch operator necessary information about public-safety officers. As discussed above, some of this information originates from devices 112 providing information to radios 137, which forwards the information to RAN 135 and ultimately to dispatch center 131.

In a similar manner information about public-safety officers may be provided to workflow server 102. This information originates from devices 112 providing information to radios 137, which forwards the information to RAN 135 and ultimately to workflow server 102 via core network 132 and gateway 133. For example, a gun-draw sensor 112 may send an indication to workflow server 102 that a gun has been drawn. This may serve as a "trigger" for workflow server 102 to initiate a particular "action", for example, notifying surrounding officers (for example on a particular talkgroup) by having their radios 137 provide an alarm indicating the triggering event. Thus, workflow server 102 may provide instructions to any device 112 or radio 137 by sending an "action" to devices 112 in response to a trigger being received.

Figure 2:
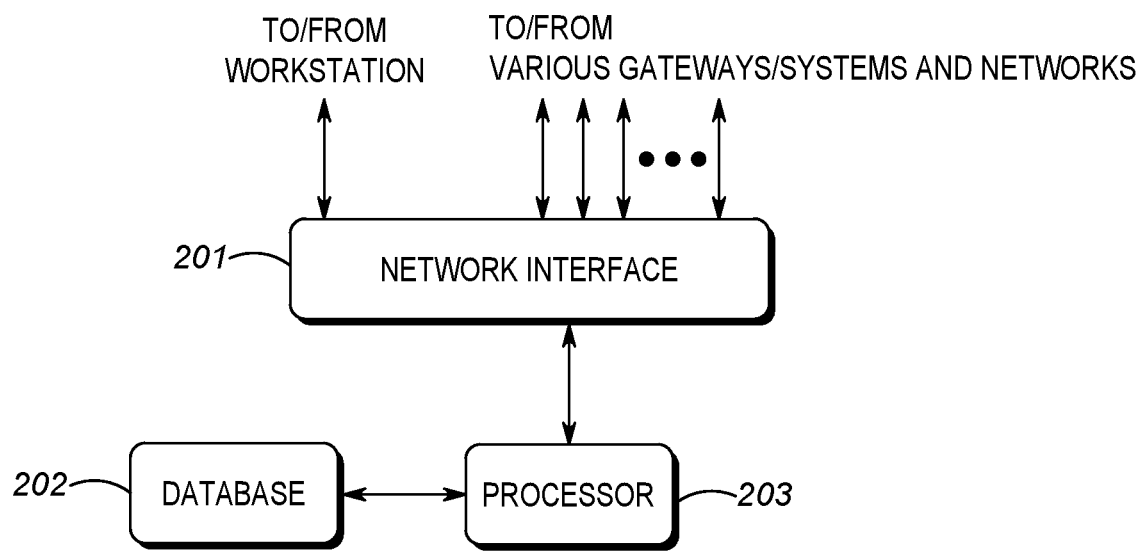
FIG. 2 is a block diagram of a workflow server of FIG. 1.

FIG. 2 is a block diagram of a workflow server of FIG. 1. As shown, workflow server 102 comprises network interface 201, database 202, and processor (serving as logic circuitry) 203.

Network interface 201 includes elements including processing, modulating, and transceiver elements that are operable in accordance with any one or more standard or proprietary wireless interfaces, wherein some of the functionality of the processing, modulating, and transceiver elements may be performed by means of processor 203 through programmed logic such as software applications or firmware stored on the storage component 202 (e.g., standard random access memory) or through hardware. Examples of network interfaces (wired or wireless) include Ethernet, T1, USB interfaces, IEEE 802.11b, IEEE 802.11g, etc.

Logic circuitry 203 comprises a digital signal processor (DSP), general purpose microprocessor, a programmable logic device, or application specific integrated circuit (ASIC) and is configured to receive triggers from various gateways, systems, and networks. Once a trigger is received, logic circuitry 203 is configured to execute (or cause to be executed) a particular action for the trigger. More particularly, when logic circuitry 203 receives a trigger from any attached network or system, logic circuitry will access database 202 to determine an action for the particular trigger. Once an action has been determined, logic circuitry will execute the action, or cause the action to be executed. In order to perform the above, logic circuitry executes an instruction set/software (e.g., Motorola Solution's Command Central™ software suite comprising the Orchestrate™ platform) stored in database 202.

Database 202 comprises standard memory (such as RAM, ROM, . . . , etc) and serves to store associations between triggers and actions. This is illustrated in Table 1, below.

TABLE 1

Associations Between Triggers and Actions.

| Trigger | Action |
| --- | --- |
| Warehouse back door opened | Pan camera 342 to point at door |
| Man-Down sensor activated for Officer Smith | Notify dispatch center via emergency text message |
| ALPR for delivery truck | Open back gate |
| . . . etc. | . . . etc. |

Figure 3:
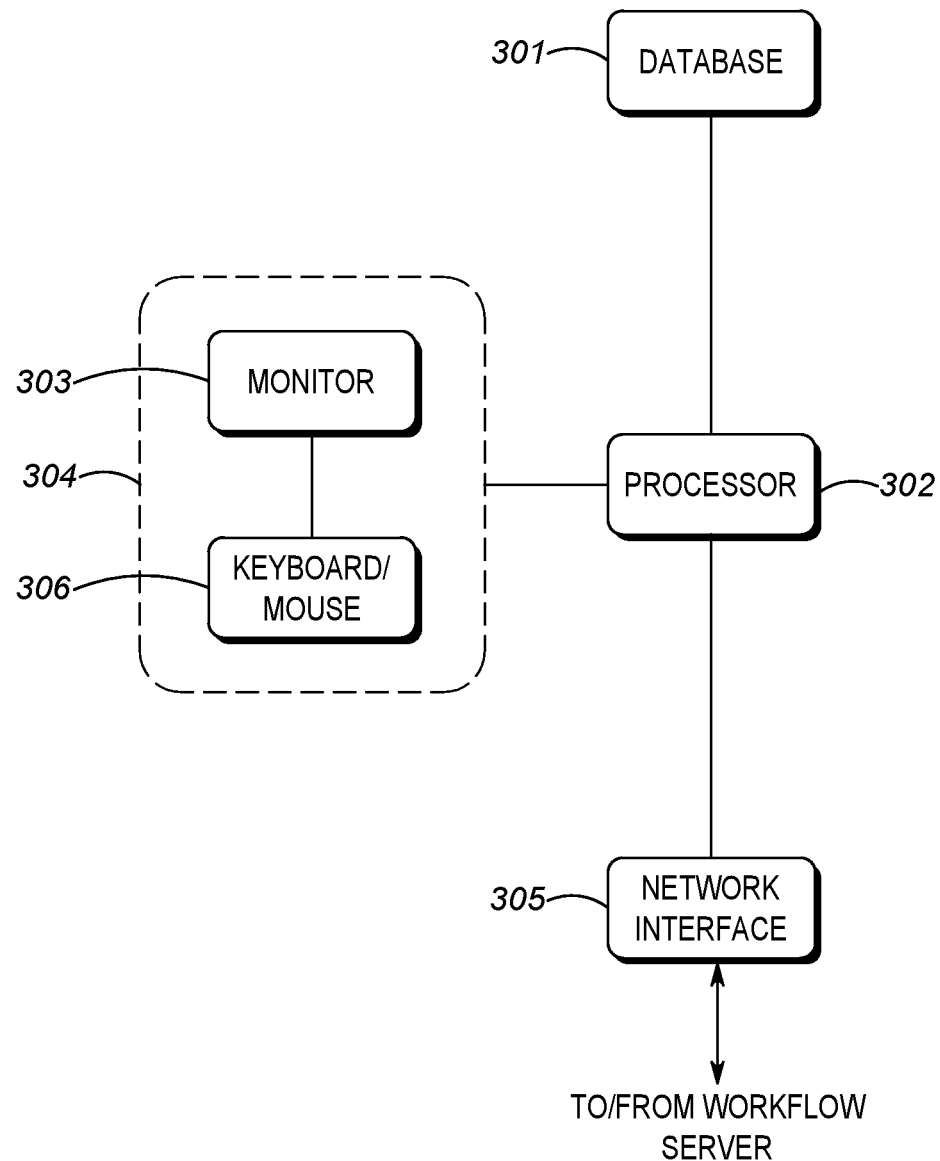
FIG. 3 is a block diagram of a workstation of FIG. 1 utilized to create a workflow.

FIG. 3 is a block diagram of a workstation of FIG. 1 utilized to create a workflow. As shown, workstation 101 comprises database 301, processor 302, graphical user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware. Examples of network interfaces (wired or wireless) include Ethernet, T1, USB interfaces, IEEE 802.11b, IEEE 802.11g, etc.

Logic circuitry 302 comprises a digital signal processor (DSP), general purpose microprocessor, a programmable logic device, or application specific integrated circuit (ASIC) and is configured to execute Motorola Solution's Orchestrate™ and Ally™ dispatch and incident management software from storage 301. The execution of such software will allow users of GUI 304 to create workflows (i.e., actions and their associated responses) by receiving user inputs from GUI 304 that define various triggers and their associated actions, which will ultimately be uploaded to workflow server 102 and stored in database 202.

Database 301 comprises standard memory (such as RAM, ROM, . . . , etc) and serves to store instructions as software. Particularly, Motorola Solution's Orchestrate™ and Ally™ dispatch and incident management software is stored in database 301.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprises any combination of monitor 303 (e.g., touch screen, a computer screen, . . . , etc.) and keyboard/mouse combination 306.

Figure 4:
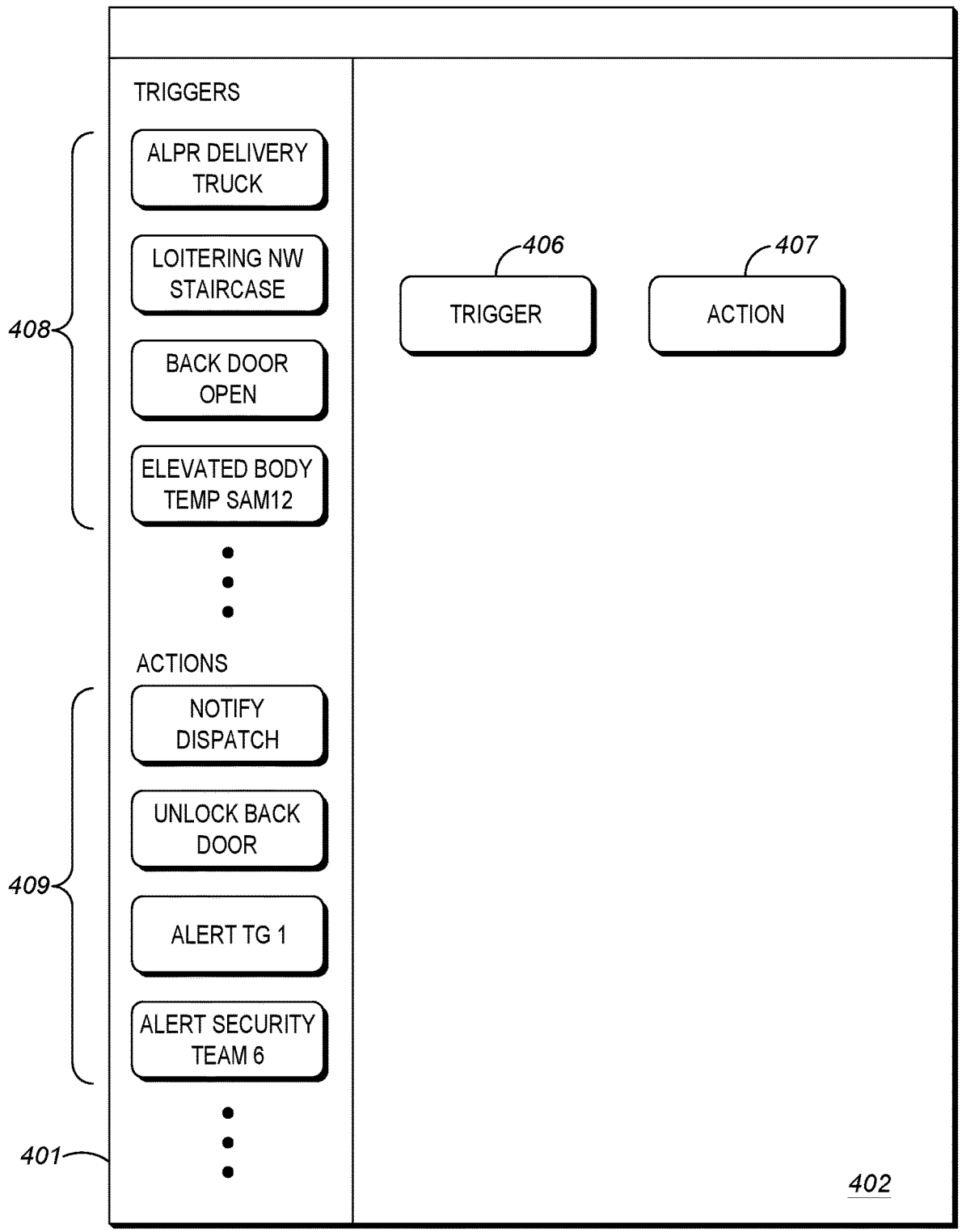
FIG. 4 illustrates the creation of a workflow.

FIG. 4 illustrates the creation of a workflow. More particularly, FIG. 4 illustrates a dashboard displayed on monitor 303 utilized for the creation of workflows. The dashboard consists of the following main elements:
- selection pane 401 on the left-hand side, which comprises the available triggers 408 and actions 409;
- workspace 402, which comprises the large area in the middle of the dashboard used to create workflows that define the connections between products. Each workflow in the workspace is displayed as a separate field 406 and 407 with an outline and a title. As shown in FIG. 4, two fields 406 and 407 are shown, one labeled "trigger" and another labeled "action".

Triggers 408 represent the events originating from various sensors, software, and devices within security ecosystem 100. Actions 409 represent the possible responses to the triggers.

After a workflow is deployed (i.e., uploaded to workflow server 102), its actions activate when the triggers occur. Triggers and actions appear on the workspace after they are dragged and dropped from the triggers 408 and actions 409 tabs respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, . . . , etc. As administrators add additional technology pieces to security ecosystem 100, those pieces are automatically made available for workflow creation as discussed herein.

In order to associate a trigger with an action, a user selects a trigger from all possible triggers 406, and drags and drops it onto workspace area 402. The user then selects an action for the trigger, and drags and drops it onto workspace area 402. In order to associate the trigger with the action, they must be connected. To connect the trigger and actions, a user will click the end of one of the node, and drag a line to the other node.

Figure 5:
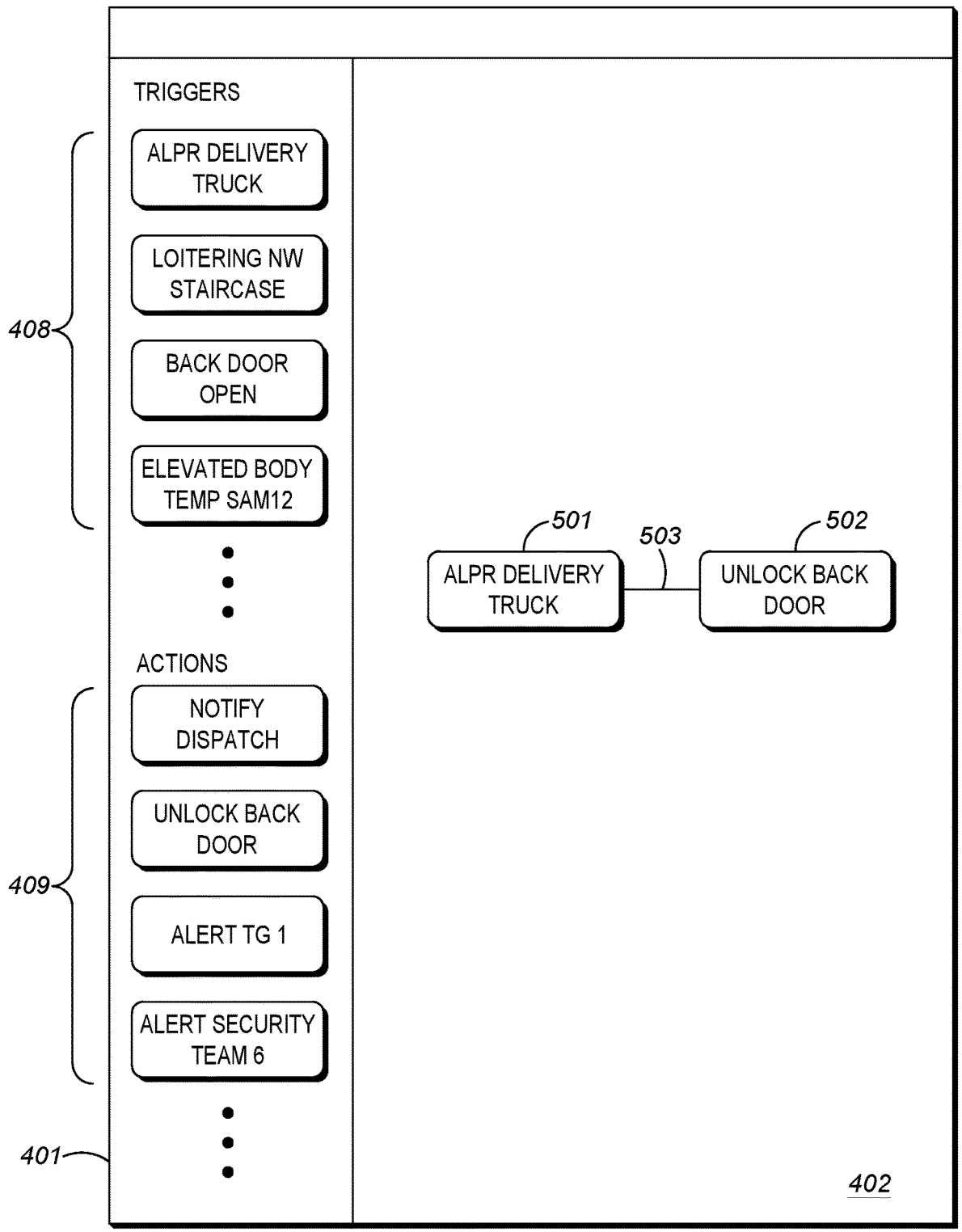
FIG. 5 illustrates the creation of a workflow.

As shown in FIG. 5, a trigger "ALPR delivery truck" 501 has been associated with an action "unlock back door" 502 by dragging line 503 between the two. If any of the triggers within a trigger group occurs, the workflow is initiated causing the action to be executed.

Figure 6:
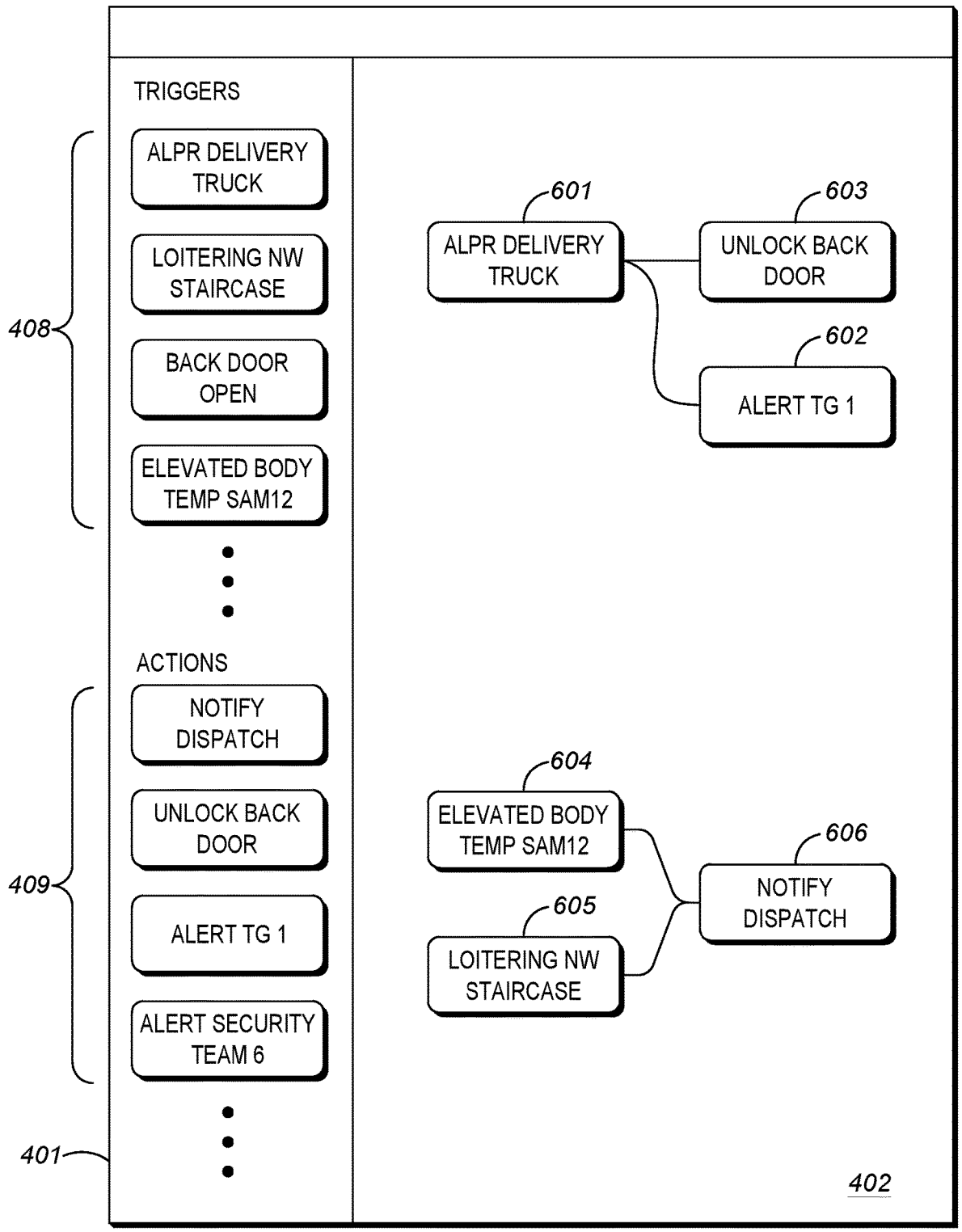
FIG. 6 illustrates the creation of a workflow.

As illustrated in FIG. 6, a single trigger may be associated with multiple actions. Thus, the trigger "ALPR delivery truck" 601 may be associated with action "unlock back door" 603 as well as associated with "alert TG 1" 602. When this workspace is uploaded to workflow server 102, the automatic license plate detected for the delivery truck will cause both the back door to unlock and an alert to be sent on talkgroup #1.

In a similar manner multiple triggers may be associated with a single action. Thus, both the triggers "elevated body tem SAM 12" 604 and "loitering NW staircase" will cause the action of "notify dispatch" 606. Thus, when officer SAM 12 has an elevated body temperature dispatch is notified, and when loitering is detected in the NW staircase, dispatch is notified.

As mentioned above, users can create and implement workflows by associating a trigger with a particular action. Once the trigger is detected, the associated action is executed. However, in some situations it would be beneficial if workflows can be automatically created or suggested to a user. For example, it would be beneficial if a workflow could be automatically generated or suggested based upon the detection of new device capabilities (e.g., updating a device, or replacing the device with a new device). In particular, it would be beneficial if a workstation can be notified of the presence of new device capabilities and determine an appropriate trigger and action based on the new device capabilities. The appropriate trigger and action can then be implemented or suggested as a newly-created workflow.

With the above in mind, workstation 101 will be notified of new device capabilities when a device is updated, upgraded, or replaced. The notification may be from a user utilizing GUI 301, or because database 301 was updated with new device capabilities.

Database 301 comprises a list of all devices that are part of the ecosystem and workflows for the devices that are part of the ecosystem. For example, security camera X is connected to the system & associated with a workflow having a trigger of "loitering detected" at Gate A. Database 301 will also comprise a list of capabilities for each device within the ecosystem (e.g. security camera X is capable of performing analytic or loitering detection).

When an existing device is being replaced, a user will update database 301 with the new device capabilities via GUI 304. (It should be noted that the term "new" device is assumed to encompass an updated or upgraded device as well as a totally new device.) The user can then notify workstation 101 that a new device is replacing an old device via GUI 304. Workstation 101 will then retrieve the new device's capability or device specification info from database 301. Workstation 101 will then determine the capability or specification differences between the previous device and the new device. In particular, the "old" workflows utilizing the old device will be analyzed to determine the "old" capabilities for the device. The old capabilities will be compared to the updated device capabilities in database 301. For example, assume security camera Y is replacing security camera X that has been previously associated with trigger "loitering detected". Workstation 101 will determine what new triggers can be added to improve the workflow that is associated with that same trigger (loitering detected). Since database 301 is updated with new triggers and actions based on the new device capabilities, the new triggers and actions can be compared to the old triggers and actions. Processor 302 will suggest new workflows based on the new triggers and actions available in database 301.

Figure 7:
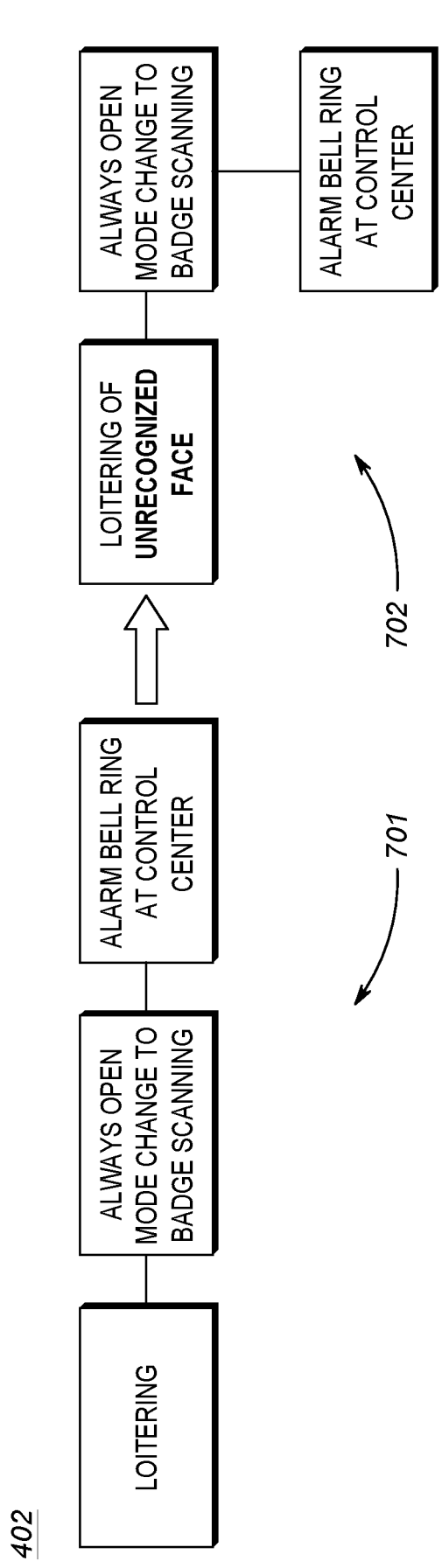
FIG. 7 illustrates a new workflow presented to a user.

Consider the following example in FIG. 7: Workflow 701 has a trigger of "loitering detected" and an action of converting an unlocked door to entry by badge scanning, and alarming a control center. The camera that performs loitering detection is upgraded to have facial recognition capabilities. When notified of the upgraded device and its new capabilities (e.g., a new trigger of "unrecognized face") updated workflow 702 may be generated. This generation may be automatic based on the detection of the new trigger in database 301, or workstation 101 being notified of the upgrade. Thus, a new trigger for the updated workflow may comprise "loitering detected for an unrecognized individual". This is shown in FIG. 7 with the original workflow 701 and the suggested workflow 702 being shown as a presentation to a user within workspace 402. The user is given an opportunity to accept or reject the suggested updated workflow.

Figure 8:
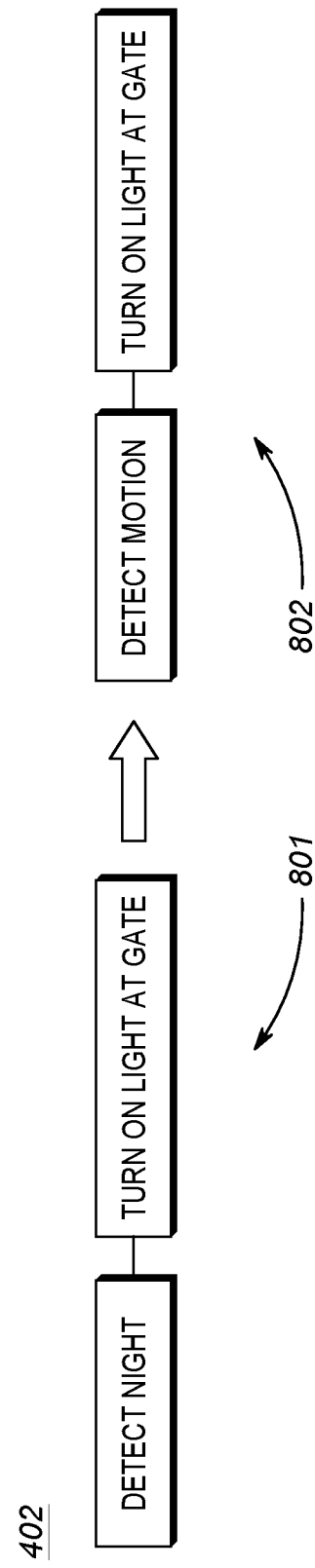
FIG. 8 illustrates a new workflow presented to a user.

Consider the following example: A workflow 801 has a trigger of "detecting darkness (night)" and an action of turning on a gate light. The camera that performs night detection is upgraded to have motion detection capabilities. With this upgrade, a new trigger of "detect motion" is inserted into database 301. When database 301 is updated, an updated workflow may be generated based on the detection of the new trigger. In particular, a new trigger for the updated workflow 802 may comprise "detect motion". This is shown in FIG. 8 with the original workflow 801 and the suggested workflow 802 being shown as a presentation to a user within workspace 402. The user is given an opportunity to accept or reject the suggested updated workflow.

Figure 9:
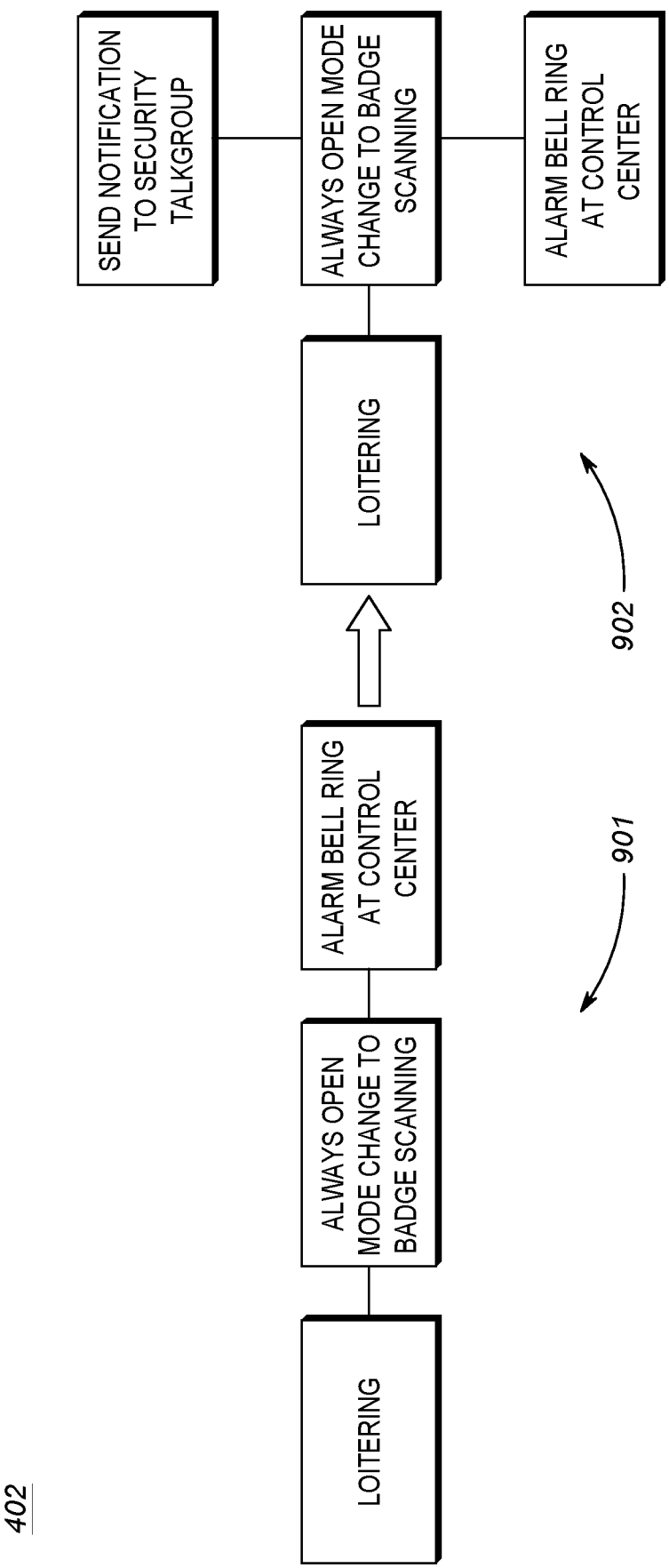
FIG. 9 illustrates a new workflow presented to a user.

FIG. 7 and FIG. 8 illustrated the suggestion of new workflows based on updating workflows with new triggers, however, new workflows may also be suggested based on new actions being available for the new device. For example, consider a situation where a radio communication system is being upgraded to have an additional new feature of sending notification via messaging to a talkgroup, and an action of "send notification to security talkgroup" is added to database 301. New workflows 902 may be suggested based on the addition of the new action. This is illustrated in FIG. 9 where workflow 901 is suggested to be changed to workflow 902, having the addition of the new action detected within database 301.

In one embodiment of the present invention, logic circuitry 302 determines those workflows that could utilize the new actions or the new triggers by determining those workflows using devices that have new actions or new triggers associated with them. More particularly, if a particular device (e.g., a particular camera) is associated with a workflow, and logic circuitry 302 determines that a trigger or action for the particular camera is newly added, then logic circuitry will suggest new workflows for all workflows involving the particular camera. In doing this, logic circuitry determines the updated workflows by adding the new action or the new trigger to an implemented workflow.

In one embodiment of the present invention, logic circuitry 302 determines those workflows that could utilize the new actions or the new triggers by matching the new capabilities of the devices with the keywords that related to potential triggers and actions that retrieved from electronic documents that contain a security standard operating procedures (SOP). For example, an electronic document that contains a security SOP is uploaded to database 301. Processor 302 can search through the electronic document using natural language processing and keyword search and determine that trigger of "loitering of unrecognized face" is related to the security SOP as compared to "loitering detected" because the electronic document contains a text statement of "if a person that is not a company employee is detected loitering at Gate A, . . . ". Thus the logic circuitry can automatically associate the trigger of "loitering of unrecognized face" to workflow related to location Gate A. As mentioned, when a new device (in this case, the camera at Gate A) is upgraded with the new capability of detecting "loitering of unrecognized face", that new trigger is added to the respective workflow that relates to Gate A.

Additionally, in one embodiment of the present invention, monitor 303 presents the updated workflows to the user as a comparison between an old workflow and an updated workflow.

It should be noted that in the above description, logic circuitry 302 determines that new actions and triggers exist by determining that database 301 has been populated with the new actions and triggers. In other embodiments of the present invention, logic circuitry 302 may determine new actions and triggers exist in other ways. For example, a user using GUI 304 may report this information to processor 302. Alternatively, workflow server 102 may provide this information to workstation 101 (and ultimately to logic circuitry 302).

With the above in mind, workstation 101 comprises an apparatus comprising database 301 comprising actions for a workflow, triggers for a workflow, and a plurality of implemented workflows. As discussed above, database 301 may be populated with updated triggers and actions. Database 301 may also be populated with updated device capabilities for new or upgraded devices.

Logic circuitry 302 is provided and configured to determine that database 301 has been populated with new actions or new triggers. As discussed, this may be accomplished by an operator of GUI 304 updating database 301 with the new actions or new triggers. When this happens, logic circuitry 302 is configured to analyze the plurality of implemented workflows to determine those workflows that can utilize the new actions or the new triggers. This can be accomplished by determining those workflows using devices that have new actions or new triggers associated with them.

Logic circuitry 302 then determines updated workflows based on the workflows that can utilize the new actions or the new triggers and updates the workflows with the new actions or triggers. The updated workflows may be determined based on keywords from an electronic document that contain a security standard operating procedure (SoP). The security SoP may be stored in database 301 and analyzed to determine processes and procedures that should be implemented as part of standard operations. The procedures can then have workflows created for them with the new device capabilities. In another embodiment, the updated workflows may be determined by replacing the old device capabilities with the new device capabilities.

Graphical user interface 304 is configured to present the updated workflows to a user as a comparison between an old workflow and an updated workflow. Graphical user interface 304 is also configured to populate the database with the new actions or the new triggers if a user chooses to populate database 301 with new device capabilities.

When a single device is being upgraded, replaced, or updated, workstation 101 comprises database 301 comprising actions for a workflow, triggers for a workflow, and a plurality of implemented workflows. Logic circuitry 302 is provided and configured to determine that new actions or new triggers exist for a particular device that is being upgraded or replaced, determine a plurality of implemented workflows involving the particular device, and determine updated workflows involving the particular device based on the new actions or new triggers.

Logic circuitry determines 302 determines the updated workflows by determining those workflows using the particular device and by adding a new action or a new trigger to an implemented workflow. As discussed above, the updated workflows may be determined based on keywords from an electronic document that contain a security standard operating procedure.

As an example of the above, assume that standard operating procedures allow a notification to be sent to a security talkgroup when loitering is detected by an unrecognized individual. However, in the current system, the camera X that is associated to this workflow only has capability of detecting "loitering" and thus the workflow only associates the trigger of "loitering detected" to action of "send notification to security talkgroup". One year later, the user removed camera X and replaced it with camera Y that has the additional capability of face recognition and is able to access to the company employee list with face identifiers. Database 301 is updated with the new capabilities and logic circuitry 302 suggests the trigger detection of "loitering of unrecognized face" be enabled in the system. Since the trigger of "loitering of unrecognized face" is part of the security SOP.

Graphical user interface 304 is configured to present the updated workflows to a user as shown in FIG. 6 through FIG. 9.

Figure 10:
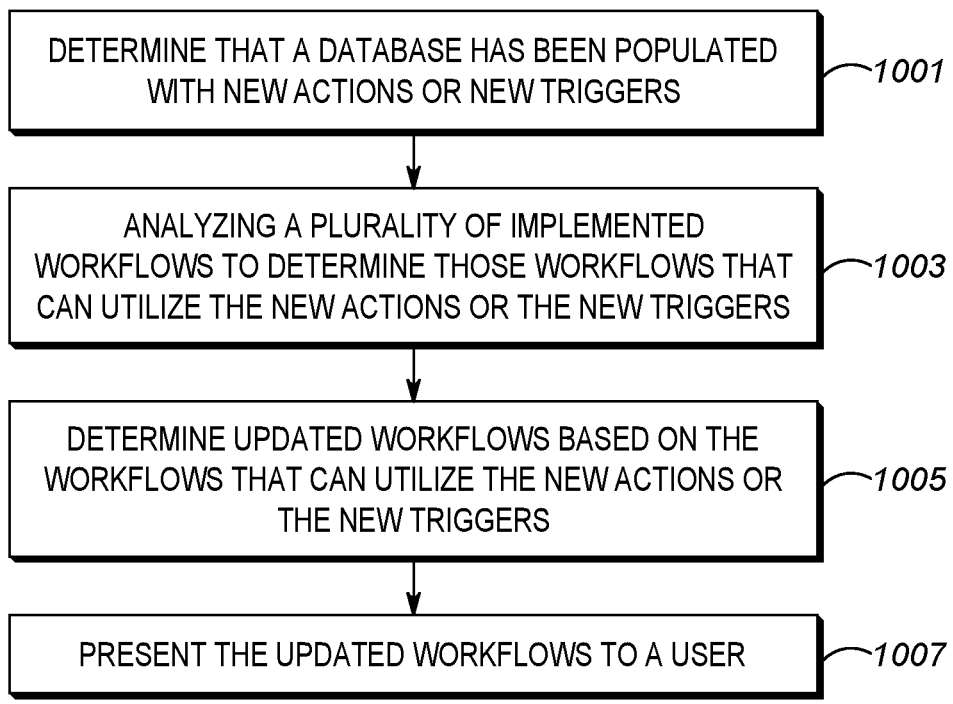
FIG. 10 is a flow chart showing operation of the workstation of FIG. 1.

FIG. 10 is a flow chart showing operation of workstation 101. The logic flow begins at step 1001 where logic circuitry 302 determines that a database 301 has been populated with new actions or new triggers. At step 1003 logic circuitry 302 analyzes a plurality of implemented workflows to determine those workflows that can utilize the new actions or the new triggers. As discussed above, in one embodiment of the present invention, step 1003 comprises logic circuitry 302 determining which workflows involve a device that has new triggers and actions available for it. These new triggers and actions represent triggers and actions available because, for example, the device was upgraded.

Continuing, the logic flow continues to step 1005 where logic circuitry 302 determines updated workflows based on the workflows that can utilize the new actions or the new triggers. As discussed the workflows that can utilize the new actions or the new triggers are updated with the new actions or new triggers, where the new actions or the new triggers are based on new capabilities of the updated device.

Finally, at step 1007 the new workflows are presented to a user. Preferably, the new workflows are presented within workspace 402 as discussed above.

As discussed above, logic flow illustrated in FIG. 10 may further comprise the step of receiving a user input comprising the new actions or the new triggers and populating the database with the new actions or the new triggers.

Additionally, the step of determining those workflows that could utilize the new actions or the new triggers may comprise the step of determining those workflows using devices that have new actions or new triggers associated with them.

Finally, the step of determining updated workflows may comprise the step of adding a new action or a new trigger to an implemented workflow.

Figure 11:
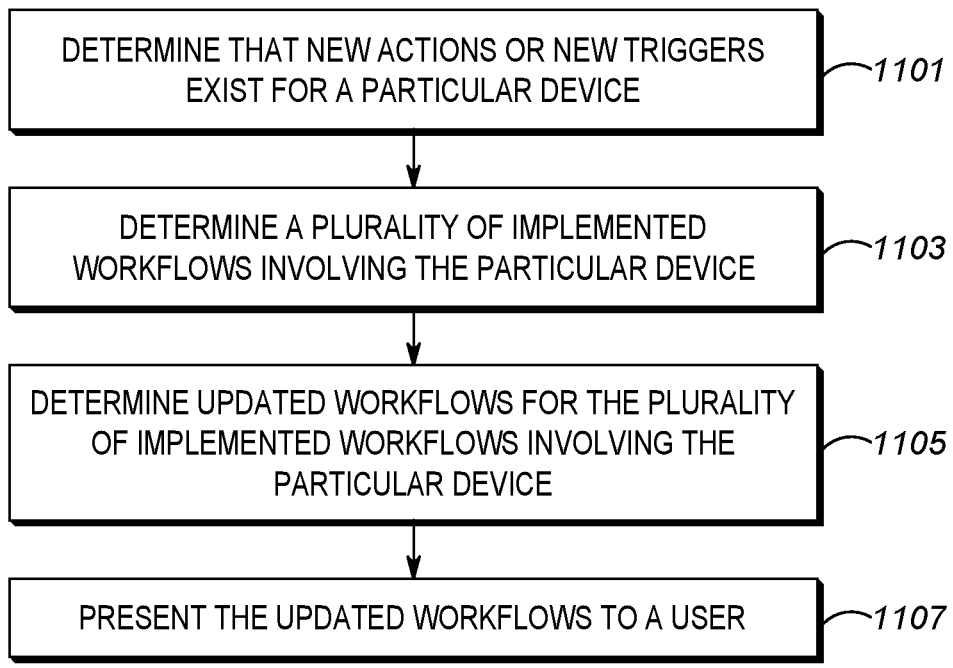
FIG. 11 is a flow chart showing operation of the workstation of FIG. 1.

FIG. 11 is a flow chart showing operation of workstation 101. The logic flow begins at step 1101 where logic circuitry 302 determines that new actions or new triggers exist for a particular device. At step 1103 logic circuitry 302 determines a plurality of implemented workflows involving the particular device. The logic flow continues to step 1105 where logic circuitry 302 determines updated workflows for the plurality of implemented workflows involving the particular device. Finally, at step 1107 GUI 304 presents the updated workflows to a user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a database comprising actions for a workflow, triggers for a workflow controlling a security camera, and a plurality of implemented workflows for the security camera;
logic circuitry configured to:
  determine that the database has been populated with new actions or new triggers for the security camera;
  analyze the plurality of implemented workflows for the security camera to determine those workflows that can utilize the new actions or the new triggers for the security camera;
  compare the new actions or new triggers for the security camera to old actions and old triggers for the security camera;

determine updated workflows for the security camera based on the comparison; and a graphical user interface configured to present the updated workflows for the security camera to a user; wherein the plurality of implemented workflows comprise a trigger that triggers an action for the security camera.

2. The apparatus of claim 1 wherein the graphical user interface is also configured to populate the database with the new actions or the new triggers for the security camera.

3. The apparatus of claim 1 wherein the logic circuitry determines those workflows that could utilize the new actions or the new triggers for the security camera by determining those workflows using the security camera.

4. The apparatus of claim 1 wherein the logic circuitry determines the updated workflows for the security camera by adding a new action or a new trigger to an implemented workflow for the security camera.

5. The apparatus of claim 1 wherein the updated workflows for the security camera are determined based on keywords from an electronic document that contain a security standard operating procedure for the security camera.

6. The apparatus of claim 1 wherein the graphical user interface presents the updated workflows for the security camera to the user as a comparison between an old workflow for the security camera and an updated workflow for the security camera.

7. An apparatus comprising:
a database comprising actions for a workflow, triggers for a workflow, and a plurality of implemented workflows for a security camera;
logic circuitry configured to:
determine that new actions or new triggers exist for a-the security camera that is being upgraded or replaced; determine a plurality of implemented workflows for the security camera;
compare the new actions or new triggers for the security camera to old actions and old triggers for the security camera; determine updated workflows for the security camera based on the comparison; and
a graphical user interface configured to present the updated workflows for the security camera to a user; wherein the plurality of implemented workflows comprise a trigger that triggers an action for the security camera.

8. The apparatus of claim 7 wherein the logic circuitry determines the updated workflows for the security camera by determining those workflows using the security camera.

9. The apparatus of claim 7 wherein the logic circuitry determines the updated workflows by adding a new action or a new trigger for the security camera to an implemented workflow for the security camera.

10. The apparatus of claim 7 wherein the updated workflows for the security camera are determined based on keywords from an electronic document that contain a security standard operating procedure for the security camera.

11. The apparatus of claim 7 wherein the graphical user interface presents the updated workflows for the security camera to the user as a comparison between an old workflow for the security camera and an updated workflow for the security camera.

12. A method comprising the steps of:
determining that a database has been populated with new actions or new triggers for a newly upgraded security camera;
analyzing a plurality of implemented workflows for the security camera to determine those workflows for the security camera that can utilize the new actions or the new triggers;
determining updated workflows for the security camera based on the workflows for the security camera that can utilize the new actions or the new triggers for the security camera; and
presenting the updated workflows for the security camera to a user; wherein the plurality of implemented workflows comprise a trigger that triggers an action for the security camera.

13. The method of claim 12 wherein the step of analyzing the plurality of implemented workflows for the security camera to determine those workflows for the security camera that can utilize the new actions or the new triggers comprises the step of analyzing the plurality of implemented workflows for the security camera and determining those workflows for the security camera that have new actions or new triggers associated with them.

14. A method comprising the steps of:
determining a security camera is being upgraded;
determining that new actions or new triggers exist for the security camera;
determining a plurality of implemented workflows involving the security camera;
determining updated workflows for the plurality of implemented workflows involving the security camera; and
presenting the updated workflows for the security camera with the new actions or new triggers to a user; wherein the plurality of implemented workflows comprise a trigger that triggers an action for the security camera.

* * * * *